Patented Apr. 24, 1951

2,550,243

UNITED STATES PATENT OFFICE 2,550,243

PROCESS FOR THE BIOLOGICAL PRODUCTION OF CITRIC ACID

Evert H. Groot, Amsterdam, Netherlands, assignor to Naamlooze Vennootschap: W. A. Scholten's Aardappelmeelfabrieken, Groningen, Netherlands, a corporation of the Netherlands No Drawing. Application August 11, 1947, Serial No. 768,083. In the Netherlands October 2, 1945

Section 1, Public Law 690, August 8, 1946
Patent expires October 2, 1965

5 Claims. (Cl. 195—36)

It has already been known to produce citric acid from carbohydrates, and particularly from saccharose by biological processes. A micro-organism which is particularly suited for the purpose is *Aspergillus niger*, according to Perquin (Dissertation, Delft, 1938). Thus, citric acid may be prepared by cultivating the micro-organisms capable of producing citric acid in a sugar solution containing the required nutrient inorganic salts, and recovering the resulting citric acid in a known way from the fermented solution.

It has now been found according to the present invention that the said process may be materially improved and increased yields of citric acid may be obtained, by cultivating micro-organisms capable of producing citric acid in a sugar solution which in addition to the usual mineral substances required for the biological conversion, also contains the material of the tuberous roots of plants of Beta and/or Brassica species, the said material being preferably incorporated with the nutrient liquid in the form of an aqueous extract. It has been experienced most surprisingly that in consequence of the said addition the amount of citric acid formed in the time unit is considerably increased. The extract of red beets was found to be particularly suitable for the purpose, although good results were also obtained with extracts of sugar beets and turnips.

The effect of the process according to the invention may further appear from the results of a series of tests with *Aspergillus niger* cultivated in nutrient liquids of the following composition:

|  | medium A | medium B |
|---|---|---|
| saccharose | 14% | 14% |
| KH$_2$PO$_4$ | 25 mg./100 cm.$^3$ | 7.6 mg./100 cm.$^3$ |
| NH$_4$NO$_3$ | 200 mg./100 cm.$^3$ | 200 mg./100 cm.$^3$ |
| Mg SO$_4$.7H$_2$O | 25 mg./100 cm.$^3$ | 25 mg./100 cm.$^3$ |

The initial pH of the liquid was 4.0.

The extracts of the roots were prepared by treating the raw material with distilled water at 70° C. for about 16 hours, filtering the mass through a suction filter, and sterilizing the filtrate. Sugar beets were used in peeled condition.

The first series of tests were carried out with the use of extracts prepared by treating one part by weight of sugar beets, turnips or red beets with 2.5 parts by weight of water as above described, and adding 50 cm.$^3$ of extract on each 100 cm.$^3$ of the above tabulated nutrient liquids. The cultivating period was 6 days, and all tests were carried out in duplicate. The amounts of citric acid formed in the various tests were as follows:

| Extract added | Citric acid, Per Cent |
|---|---|
| none | {1.6, 0.6} average 1.15 |
| sugar beets | {3.0, 2.9} average 2.95 |
| turnips | {3.2, 2.9} average 3.05 |
| red beets | {3.7, 3.6} average 3.65 |

In the following series of tests also 1:2.5 extracts were used, whereas the total cultivation period amounted to 7 days. The amounts of citric acid formed were as follows:

| Extract added | Citric acid, Per Cent |
|---|---|
| none | {1.1, 1.9} average 1.5 |
| sugar beets | {7.1, 7.5} average 7.3 |
| turnips | {8.5, 8.3} average 8.4 |
| red beets | 11.8, average 11.8 |

As may appear from these tests, sugar beet and turnip extracts have substantially the same stimulating effect on the citric acid production, whereas the red beet extract has a definitely stronger effect.

It is not known with certainty to which components of the said vegetable materials the stimulating effect is to be attributed. However, it was found advantageous to peel the sugar beets before preparing the extract, as the peel seems to contain some substances which counteract the stimulation of the citric acid formation.

While it may generally be preferred to add the extracts of the roots of Beta and Brassica species to the nutrient solution used for the cultivation of the micro-organisms capable of producing citric acid, satisfactory results may also be achieved by adding the material of the tuberous roots itself in a more or less finely divided condition to the nutrient solution, although in the latter way the improvement of the yield of citric acid may be less striking.

I claim:

1. A process of producing citric acid, which comprises cultivating a mold of the Aspergillus group in a nutrient medium consisting of a sugar solution containing 14% of saccharose in addition to the inorganic salts required in a nutrient medium, to which nutrient medium an aqueous extract of red beets has been added in a proportion of about 0.50 liter of an extract of 1 part by weight of the tuberous root with about 2½ parts by weight of water, per liter of nutrient medium.

2. A process of producing citric acid, which comprises cultivating a mold of the Aspergillus group in a nutrient medium consisting of a sugar solution containing 14% of saccharose in addition to the inorganic salts required in a nutrient medium, to which nutrient medium an aqueous extract of a tuberous root of a plant of the Beta species has been added in a proportion of about 0.50 liter of an extract of 1 part by weight of the tuberous root with about 2½ parts by weight of water, per liter of nutrient medium.

3. A process of producing citric acid, which comprises cultivating *Aspergillus niger* in a nutrient medium consisting of a sugar solution containing 14% of saccharose in addition to the inorganic salts required in a nutrient medium, to which nutrient medium an aqueous extract of a tuberous root of a plant of the Beta species has been added in a proportion of about 0.50 liter of an extract of 1 part by weight of the tuberous root with about 2½ parts by weight of water, per liter of nutrient medium.

4. A process of producing citric acid, which comprises cultivating *Aspergillus niger* in a nutrient medium consisting of a sugar solution containing 14% of saccharose in addition to the inorganic salts required in a nutrient medium, to which nutrient medium an aqueous extract of red beets has been added in a proportion of about 0.50 liter of an extract of 1 part by weight of the tuberous root with about 2½ parts by weight of water, per liter of nutrient medium.

5. A process of producing citric acid, which comprises cultivating *Aspergillus niger* in a nutrient medium consisting of a sugar solution containing 14% of saccharose in addition to the inorganic salts required in a nutrient medium, to which nutrient medium an aqueous extract of peeled sugar beets has been added in a proportion of about 0.50 liter of an extract of 1 part by weight of the tuberous root with about 2½ parts by weight of water, per liter of nutrient medium.

EVERT H. GROOT.

REFERENCES CITED

The following references are of record in the file of this patent:

UNITED STATES PATENTS

| Number | Name | Date |
|---|---|---|
| 2,094,023 | Pollak | Sept. 28, 1937 |
| 2,415,777 | Weizmann | Feb. 11, 1947 |

FOREIGN PATENTS

| Number | Country | Date |
|---|---|---|
| 146,430 | Great Britain | Mar. 24, 1921 |
| 370,039 | Great Britain | Apr. 1, 1933 |
| 16,651 | Australia | of 1928 |